Patented June 5, 1951

2,555,514

UNITED STATES PATENT OFFICE 2,555,514

WHEY PRODUCT DERIVED FROM MILK AND PROCESS OF PRODUCING SAME

Paul Francis Sharp, Piedmont, David D. Peebles, Hillsborough, Le Roy Raymond Hawk, San Francisco, and Arthur M. Besemer, Alameda, Calif., assignors to Golden State Company, Ltd., San Francisco, Calif., a corporation of Delaware No Drawing. Application January 20, 1947, Serial No. 723,212

13 Claims. (Cl. 99—57)

This application is a continuation-in-part of our co-pending application Serial No. 510,374, filed November 15, 1943, which has now abandoned.

This invention relates to a new and useful product derived from milk, and more particularly to a processed whey product which possesses certain desirable properties making it particularly useful as a substitute for milk in the manufacture of bread and like products.

This invention also relates to a novel process by which the product of this invention may be produced.

It has been the practice for a substantial period to utilize milk as an ingredient in the manufacture of bread. It is well known in the baking industry, that when milk is employed in preparing bread dough, the finished bread possesses certain desirable properties such as an improved keeping quality, good volume for the ingredients employed, and good toasting characteristics.

It has long been the purpose of investigators in this art to find a satisfactory substitute for milk, however, since it would be highly advantageous to be able to use a less expensive ingredient which would, nevertheless, give the same properties to the finished product as does milk. Many attempts have been made to use whey as such as a substitute since great quantities of whey are obtained as a by-product in the manufacture of cheese, casein, and the like. Generally speaking, however, these attempts have failed because it has been found that bread produced with unprocessed whey results in loaves having overall poor quality. For instance, it has been found that the use of unprocessed whey produces bread dough having poor moisture absorption and poor mixing characteristics and also produces finished loaves of bread which are characterized as having poor texture, poor body or crumb, poor moisture retention properties and insufficient volume for the quantity of ingredients employed. Furthermore, the lower moisture absorption property prevents the incorporation, during the dough-making procedure, of that amount of moisture requisite for good yield. In addition, the lower moisture retention property of the bread permits a rapid loss of the already reduced amount of moisture previously absorbed in the dough, and the moisture content of the bread is therefore quickly reduced below that amount requisite for best keeping qualities.

It is therefore an object of the present invention to provide a new and improved processed whey which is free from the above-stated objections and which can be used in the baking industry as a substitute for milk, since it imparts to the finished bread good moisture retention properties and the other characteristics considered necessary for overall good quality which are usually obtained only by the use of milk.

It is a further object of this invention to provide a process by which the novel product of this invention may be produced.

These and other objects not specifically enumerated will appear to those skilled in this art from an understanding of the following disclosure, which is given by way of illustration.

In carrying out the method of this invention, the whey being processed, which may be ordinary whey or whey to which vegetable, yeast, or animal protein has been added, is subjected to a number of steps including concentration, adjustment of its pH where necessary, adjustment of the calcium content, and a high heat treatment, as fully set forth below. It is critical to the results of this invention that the pH and calcium content be adjusted prior to the high heat treatment, but it is to be understood that such adjustments can be made either before or after the concentrating step. In certain instances it may be preferred to adjust either the acidity or the calcium content, or both when necessary, prior to the concentration step, while in other instances the reverse order of treatment may be preferred. Accordingly, the invention is not to be limited in this respect and the claims are to be construed as covering either order of practice irrespective of the order in which these steps appear in the claims.

When the protein content of the whey is increased by the addition of small amounts of non-milk proteins, such addition generally should not exceed 20% by weight on a dry basis. Such addition may be made at any time prior to the high heat treatment. If the protein is such as to readily take on colloidal character within the pH range of 6.0 to 6.5, then the usual procedure is that of adding the protein material prior to the pH adjustment step.

The vegetable protein, for example, protein from soybean, peanuts and the like, may be introduced in any one of a number of ways. Soybean flour may be added to the whey without any pre-treatment. On the other hand soybean protein may be prepared by the following pre-treatment. A suspension of soybean flour in water is formed and the protein precipitated therefrom by addition of acid. This precipitated protein may be separated from the suspension and added as a homogeneous component or the whole mixture of soybean flour suspension, acid, and precipitated protein may be added to the whey.

The fortification of whey with protein, has the effect of simplifying the drying operation. The effect upon the final product is to further improve and allow greater control over such dough characteristics as water absorption and speed of aging. The addition of such proteins as soybean and yeast also improve the flavor and nutritional value of the product.

In carrying out the pH adjustment step, a suitable neutralizing agent such as an alkali or an alkaline earth hydroxide is added to the whey. Sodium hydroxide, potassium hydroxide, ammonium hydroxide or calcium hydroxide, for instance, may be added in a quantity sufficient to adjust the pH of the whey being processed, to a value such that a sample of that whey, when brought to a solids concentration of 6%, will have a pH of approximately 6.0 to 6.6. It should be noted that all values of the pH given herein, including the values stated in the claims are likewise given with reference to a sample of the whey being processed, after that sample has been brought to a 6% solids concentration. It is not desirable to go beyond neutrality or approximately a pH of 7.0 when adjusting the pH because of the deleterious effect upon the nitrogen bearing protein compounds. If the whey being processed is a "sweet" whey, which usually has a pH in the neighborhood of 6.4, it is of course understood that little if any pH adjustment need be carried out. On the other hand, the quantity of neutralizing agent employed will vary considerably according to the initial acidity of a "sour" whey being treated. For this reason this invention is not to be limited to any particular quantity, provided only that in all cases the quantity of neutralizing agent should be that quantity that will adjust the pH of the whey to the desired value pointed out above.

The step of adjusting the calcium content of the whey may be carried out by any one of a number of methods by which the calcium content, measured as calcium itself, is raised to a point where it constitutes from approximately 1.5% to approximately 3.0% by weight of the dry solids of whey. From 2.0% to 2.5% is an even more desirable range, with about 2.25% being the optimum value. Of the non-poisonous elements of group II of the periodic table of elements, calcium is the only element found that both develops the desired thickening characteristic in the treated whey, and gives the treated whey the properties described above that result in the improved baking properties of the dough to which the treated whey has been added. Other elements such as magnesium and strontium cause the treated whey to exhibit the thickening characteristic but wheys containing these elements have not been found to be useful as a substitute for milk in baking.

One method of adjustment of the calcium content is to add soluble or partially soluble neutral salts, such as the "soluble" anhydride form of calcium sulfate, calcium phosphate, calcium acetate, calcium lactate, or calcium citrate to a whey having the proper pH which it may have naturally or which may be given to it through pH adjustment with a neutralizing agent. While calcium chloride may be used in this processing step, precautionary measures must be taken to reduce the amount of salt incorporated in the bread formula since the presence of too high a concentration of the chloride ion inhibits the growth of yeast, and thereby affects the breadmaking properties of the dough and the quality of the finished product.

Another method is to use calcium hydroxide as the neutralizing agent. If the whey being treated is markedly acid, for example, if it has a pH between 3.5 and 5.0, sufficient calcium may be added during the neutralizing step to reach the proper calcium content. If, however, the pH is not too low, as for example, about 5.5, the amount of calcium added as a neutralizing hydroxide may not be sufficient to reach the proper calcium content level unless one exceeds a pH of 7. Under these circumstances, after neutralizing to the proper pH range, a neutral calcium salt is added to attain the proper calcium content.

It may sometimes be advantageous to add an acid salt of calcium such as mono or di-calcium phosphate since it would possess the additional property of influencing the yeast growth. When such an acid salt is used, however, allowance must be made for its effect on the pH in the neutralizing step. Obviously, any combination of the above methods may be utilized as the circumstances permit.

The concentrating step may be carried out by evaporation or any other suitable concentrating procedure until the solids content of the whey has been materially increased, as for example, by concentrating to a point where the solids content is from approximately 25% to approximately 55%. Preferably, however, the concentration should be from 35% to 50%. Any suitable evaporating equipment may be employed and, if desired, the evaporation may be carried out in a number of stages. In such event, it is preferable to employ evaporating equipment such as the Peebles and Manning evaporator, disclosed in United States Patent No. 2,090,985, and to conduct the final stages of evaporation under high vacuum until the final concentration is increased to somewhere between about 25% and about 55% solids.

After the whey has been thus treated, the whey concentrate is next subjected to a relatively high temperature treatment, as for example, to a temperature within the range of approximately 200 degrees F. to approximately 280 degrees F. (and preferably in the neighborhood of 250 degrees F.). This heat treatment is continued at such temperature for a period sufficient to attain production of a maximum quantity of insoluble solids determinable by suitable known methods. The period of heat treatment varies from approximately one-half minute to approximately fifteen minutes depending upon certain conditions. In general the higher the calcium content and the higher the temperature, the shorter the holding time required to attain the maximum quantity of insoluble solids. The presence of such insoluble solids may be evidenced by the consistency and appearance of a custard pudding, and the same may be separated by the use of a centrifuge, or the like.

The heat treatment may be carried out in any suitable equipment, such as that in which the whey is heated by direct contact with steam, or, if desired, in a heat exchanger which has a high velocity liquid flow and which is capable of rapidly heating the whey to the desired temperature.

As has been stated above, it has been found that as a result of the above-described treatments, the whey so processed possesses qualities of markedly superior character when used in bread dough as a substitute for milk. The treatment described, including the high heat treatment, in some way alters the whey constituents so as to impart to the whey the property of increasing the water absorption and retention properties of the bread-making materials. Dough prepared with whey which has been so treated consequently possesses water absorption and retention properties which compare favorably to those of dough prepared with milk as an ingredient. In addition, dough prepared from treated whey is free from any tendency to produce "bound" loaves or loaves having insufficient volume for the ingredients employed, accompanied by poor texture and poor body or crumb. Bread thus produced is not only of excellent quality as a food but, in addition, has keeping qualities, and other characteristics comparable to those of bread produced with milk as an ingredient.

The whey product obtained as above described is a relatively inexpensive material which possesses desirable food properties and which can be used with highly successful results as an ingredient in various bread mixes in place of whole or skim milk. If desired, the product can be used in the form of a liquid concentrate or, if preferred, in the form of a dry stabilized powder. For instance, the procedure disclosed and claimed in applicant Paul F. Sharp's copending application, Serial No. 697,954, entitled "Process for Drying Solutions Containing Crystallizable Material and Product Produced Thereby," filed September 19, 1946, or any other method and means which may hereafter be devised and which successfully produces from the concentrate of this invention a satisfactory dry powder, may be employed.

This invention, therefore, does not extend to the subsequent treatments that may be employed for drying the same, nor is this invention to be restricted to any particular physical form of the final product, as all forms thereof can be satisfactorily employed in the baking industry. The wet concentrate or the dry whey may be added directly to the baking mix, for instance, or the dry powder may be mixed with water prior to the time it is introduced into the bread mix and the water suspension added to the other ingredients making up the mix.

The following examples further illustrate the invention.

Example 1

A cottage cheese whey having a pH of approximately 4.5 is first neutralized while being thoroughly agitated. This may be done by introducing into the whey a 10% by weight suspension of lime in water in a quantity sufficient to adjust the pH to approximately 6.5. This quantity of lime will produce a calcium content of approximately 2% on a dry solids basis.

The adjusted whey is next concentrated to a solids content of roughly 46% in a multiple effect evaporator. A temperature of approximately 115 degrees F. is preferably employed. This concentrate can be heated by a direct injection of steam and its temperature raised to approximately 250 degrees F. at which it is held for approximately 2 minutes with the result that a marked flocculation is apparent to the naked eye. The heated concentrate may then be spray dried to form a dry powder.

Although the amount may be varied, 6 pounds of this powder is normally used for each 100 pounds of flour in a baking formula. This amount of powder constitutes the equivalent amount of solids present in skim milk used in bread making by the standard formula. Bread prepared from the whey processed as described will have good dough characteristics, i. e. it will not be too sticky, it will have the proper water absorption and it will match the volume of bread prepared by the standard skim milk formula. This result is in marked contrast to the poor water absorption and roughly 80% to 85% volume obtained with untreated whey.

Example 2

A "sweet" whey having an original pH of approximately 6.5 may be adjusted as to calcium content by the addition with thorough agitation of a sufficient amount of the "soluble" anhydride form of anhydrous calcium sulfate, in the form of a 25% by weight slurry, to raise the calcium content to 2%.

This mixture may then be heat treated as described in Example 1 and the treatment will give substantially the same results.

Example 3

The procedure outlined in Example 1 may be slightly modified to provide a third illustrative example. According to this example, protein may be added to the whey concentrate after the same is removed from the multiple effect evaporator. For instance, 15% by weight, computed on a dry solids basis, of soy bean flour may be added to the concentrate and thereafter the mixture further treated in accordance with the procedure outlined in Example 1.

Bread prepared from the whey produced in accordance with this third example will have dough and baking characteristics similar to those of bread prepared with whey produced in accordance with Example 1, except for the fact that the product of this example will have a slightly higher water absorption property. This increase in the water absorption property provides a real advantage in that it permits the introduction initially of a large amount of water for the solids employed and in addition enhances the water retention properties.

What is claimed is:

1. The process of producing a product derived from milk which comprises, concentrating a whey having a pH of from 6.0 to 6.6 and a calcium content, computed on a dry solids basis, of between approximately 1.5% and 3.0%, to a point where the solids content is from approximately 25% to approximately 55%, and thereafter heating the concentrated whey at a temperature from approximately 200° F. to 280° F. for a period sufficient to produce insoluble edible proteinaceous material in quantity sufficient to impart a pudding-like consistency to the product.

2. The process of producing a product derived from milk which comprises, without reference to order, adjusting the pH of the whey to a value of from approximately 6.0 to 6.6, adjusting the calcium content, computed on a dry solids basis, to between 1.5% and 3.0% by weight and concentrating the whey to a point where the solids content is from approximately 25% to approximately 55%, and thereafter heating the concentrated whey at a temperature from approximately 230° F. to 260° F. for a period sufficient to produce insoluble edible proteinaceous material in quantity sufficient to impart a pudding-like consistency to the product.

3. The process of producing a product derived from milk which comprises, without reference to order, adjusting the pH of the whey by introducing into the whey a neutralizing agent in quantity sufficient to bring the pH of said whey to a value of from approximately 6.0 to 6.6, adjusting the calcium content of the whey by introducing calcium as a salt in quantity sufficient to bring the calcium content, computed on a dry solids basis, to a value of from approximately 1.5% to 3.0% and concentrating the whey to a point where the solids content is from approximately 25% to approximately 55%, and thereafter heating the concentrated whey at a temperature from approximately 230° F. to 260° F. for a period sufficient to produce insoluble edible proteinaceous material in quantity sufficient to impart a pudding-like consistency to the product, said period falling within the range of approximately one-half minute to fifteen minutes.

4. The process of producing a product derived from milk which comprises, without reference to order, simultaneously adjusting the pH of the whey to between approximately 6.0 and 6.6 and the calcium content, computed on a dry solids basis, to between approximately 1.5% and 3.0% by introducing into the whey having an initial pH in the range of 3.5 to 5.0 a sufficient quantity of calcium hydroxide and concentrating the whey to a point where the solids content is from approximately 25% to approximately 55%, and thereafter heating the concentrated whey at a temperature from approximately 230° F. to 260° F. for a period sufficient to produce insoluble edible proteinaceous material in quantity sufficient to impart a pudding-like consistency to the product, said period falling within the range of approximately one-half minute to approximately fifteen minutes.

5. The process of producing a product derived from milk which comprises, without reference to order, adjusting the pH of the whey by introducing into the whey calcium hydroxide and another neutralizing agent in quantity sufficient to bring the pH of said whey to a value of from approximately 6.0 to 6.6, adjusting the calcium content, computed on a dry solids basis, to between 1.5% and 3.0% by introducing a calcium salt and concentrating the whey to a point where the solids content is from approximately 25% to approximately 55%, and thereafter heating the concentrated whey at a temperature from approximately 230° F. to 260° F. for a period sufficient to produce insoluble edible proteinaceous material in quantity sufficient to impart a pudding-like consistency to the product, said period falling within the range of approximately one-half minute to approximately fifteen minutes.

6. The process of producing a product derived from milk which comprises, without reference to order, adjusting the pH of the whey by introducing into the whey a neutralizing agent in quantity sufficient to bring the pH of said whey to a value of approximately 6.5, adjusting the calcium content, computed on a dry solids basis, to between 2.0% and 2.5% by introducing a calcium salt and concentrating the whey to a point where the solids content is from approximately 25% to approximately 55%, and thereafter heating the concentrated whey at a temperature from approximately 230° F. to 260° F. for a period sufficient to produce insoluble edible proteinaceous material in quantity sufficient to impart a pudding-like consistency to the product.

7. The process of producing a product derived from milk which comprises, without reference to order, adjusting the pH of the whey by introducing into the whey a neutralizing agent in quantity sufficient to bring the pH of said whey to a value of from approximately 6.0 to 6.6, adjusting the calcium content of the whey by introducing calcium as a salt in quantity sufficient to bring the calcium content, computed on a dry solids basis, to a value of from approximately 2.25% and concentrating the whey to a point where the solids content is from approximately 25% to approximately 55%, and thereafter heating the concentrated whey at a temperature from approximately 230° F. to 260° F. for a period sufficient to produce insoluble edible proteinaceous material in quantity sufficient to impart a pudding-like consistency to the product.

8. The process of producing a product derived from milk which comprises, without reference to order, adjusting the pH of the whey by introducing into the whey a neutralizing agent in quantity sufficient to bring the pH of said whey to a value of from approximately 6.0 to 6.6, adjusting the calcium content of the whey by introducing calcium as a salt in quantity sufficient to bring the calcium content, computed on a dry solids basis, to a value of from approximately 1.5% to 3.0% and concentrating the whey to bring the solid content thereof to a point of from approximately 35% to approximately 55%, and thereafter heating the concentrated whey at a temperature from approximately 230° F. to 260° F. for a period sufficient to produce insoluble edible proteinaceous material in quantity sufficient to impart a pudding-like consistency to the product.

9. The process of producing a product derived from milk which comprises concentrating a whey having a pH of from 6.0 to 6.6 and a calcium content, computed on a dry solids basis, of between approximately 1.5% and 3.0% to bring the solid content thereof to a point of from approximately 35% to approximately 55%, and thereafter heating the concentrated whey at a temperature approximately 250° F. for a period sufficient to produce insoluble edible proteinaceous material in quantity sufficient to impart a pudding-like consistency to the product.

10. A new and improved whey product possessing the property of imparting to bread mixes, when used as an ingredient thereof, moisture absorption and retention properties substantially comparable to those imparted to such bread mixes by milk, when used as an ingredient thereof, and also possessing the property of imparting to finished bread products, when used as an ingredient in the mixes thereof, volume for the ingredients employed, texture and body substantially comparable to the volume for the ingredients employed, texture, and body imparted to finished bread products when milk is used as an ingredient in the mixes thereof, made in accordance with the process defined by claim 1.

11. A new and improved whey product possessing the property of imparting to bread mixes, when used as an ingredient thereof, moisture absorption and retention properties substantially comparable to those imparted to such bread mixes by milk, when used as an ingredient thereof, and also possessing the property of imparting to finished bread products, when used as an ingredient in the mixes thereof, volume for the ingredients employed, texture, and body, substantially comparable to the volume for the ingredients employed, texture, and body imparted to finished bread products when milk is used as an ingredient in the mixes thereof, made in accordance with the process defined by claim 12.

12. The process of producing a product derived from milk, which comprises concentrating whey having a pH of from 6.0 to 6.6 and a calcium content, computed on a dry solids basis, of between approximately 1.5% and 3%, and a minor proportion by dry weight of an added protein, to a point where the solids content is from approximately 25% to approximately 55% and thereafter heating the concentrated whey at a temperature of from approximately 200° F. to 280° F. for a period sufficient to produce insoluble edible proteinaceous material in quantity sufficient to impart a pudding-like consistency to the product.

13. The process of producing a product derived from milk, which comprises, without reference to order, the steps of adding protein to whey having an initial pH of approximately 3.5 to 5.0, introducing into such whey, calcium hydroxide in quantity sufficient to adjust the pH thereof to approximately 6.0 to 6.6, and to adjust the calcium content thereof, computed on a dry solids basis, to between approximately 1.5% and 3.0%, thereafter concentrating the adjusted and protein-enriched whey to a point where the solids content is from approximately 25% to approximately 55%, and finally heating the concentrated whey to a temperature of from approximately 230° F. to 260° F. for a period of from approximately one-half a minute to approximately fifteen minutes, and thus producing in said product insoluble edible proteinaceous material in quantity sufficient to impart a pudding-like consistency to said product.

PAUL FRANCIS SHARP.
DAVID D. PEEBLES.
LE ROY RAYMOND HAWK.
ARTHUR M. BESEMER.

REFERENCES CITED

The following references are of record in the file of this patent:

UNITED STATES PATENTS

| Number | Name | Date |
|---|---|---|
| 2,023,014 | Flanigan | Dec. 3, 1935 |
| 2,181,146 | Peebles et al. | Nov. 28, 1939 |
| 2,188,907 | Lavett | Feb. 6, 1940 |
| 2,336,634 | Peebles | Dec. 14, 1943 |

OTHER REFERENCES

U. S. Dept. Agriculture Circular No. 549, cited, page 90.

Food Industries, vol. 13, No. 11, Nov. 1941, pages 36 to 38 and 96.